United States Patent
Dubus et al.

(10) Patent No.: US 6,919,661 B2
(45) Date of Patent: Jul. 19, 2005

(54) ALTERNATOR-STARTER FOR MOTOR VEHICLE WITH MECHANICAL STATIC CONVERTER

(75) Inventors: Jean-Marc Dubus, Evry (FR); Pierre Mollon, Estrablin (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/363,992

(22) PCT Filed: Jul. 12, 2002

(86) PCT No.: PCT/FR02/02472

§ 371 (c)(1),
(2), (4) Date: Mar. 10, 2003

(87) PCT Pub. No.: WO03/007460

PCT Pub. Date: Jan. 23, 2003

(65) Prior Publication Data

US 2003/0184095 A1 Oct. 2, 2003

(30) Foreign Application Priority Data

Jul. 12, 2001 (FR) .............................. 01 09296

(51) Int. Cl.⁷ .............................................. H02K 47/04
(52) U.S. Cl. ......................... 310/113; 310/219; 290/46; 290/47; 290/36 R
(58) Field of Search ................................. 310/113, 219, 310/68 B; 290/46, 47, 36 R, 31, 32, 27, 22

(56) References Cited

U.S. PATENT DOCUMENTS

| | | | |
|---|---|---|---|
| 1,508,096 A | * 9/1924 | Garner | 310/113 |
| 2,184,236 A |   12/1939 | Heintz | 290/31 |
| 3,173,043 A | * 3/1965 | Newill | 310/128 |
| 4,019,104 A | * 4/1977 | Parker | 318/832 |
| 4,219,739 A |   8/1980 | Greenwell | 310/68 B |
| 4,873,463 A |   10/1989 | Jones | 290/46 |
| 5,742,111 A | * 4/1998 | Reed | 310/236 |

FOREIGN PATENT DOCUMENTS

| EP | 1 113 569 A1 | 7/2001 |
|---|---|---|
| JP | A 59-144355 | 8/1984 |

* cited by examiner

Primary Examiner—Dang Le
(74) Attorney, Agent, or Firm—Liniak, Berenato & White

(57) ABSTRACT

The reversible multiphase rotary machine includes a device (3) for supplying current to the windings (12–14) of the stator, which is produced in the form of a mechanical inverter (2) able to be coupled to the aforementioned shaft of the machine and connected to the windings (12–14) of the stator.

12 Claims, 2 Drawing Sheets

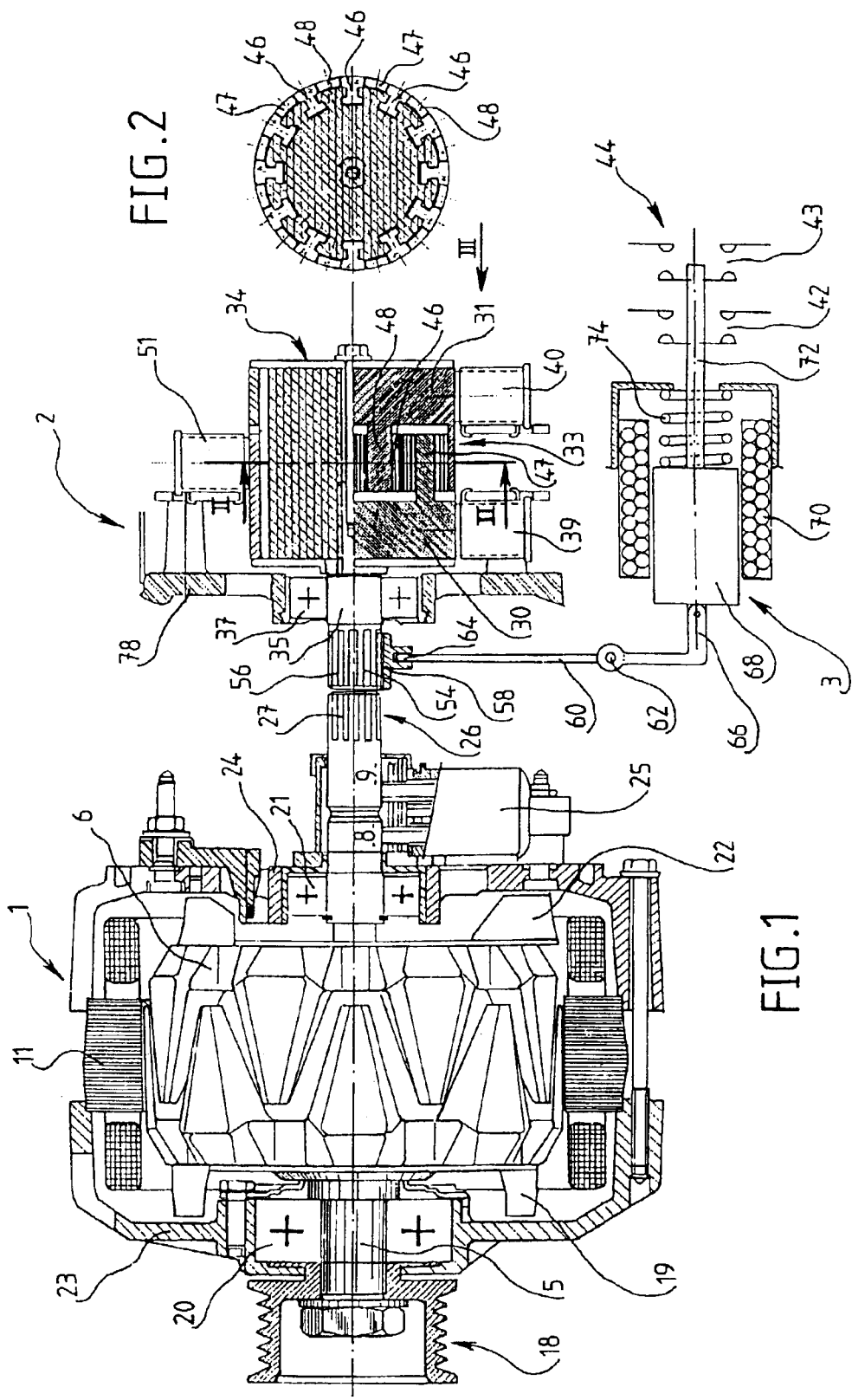

ALTERNATOR-STARTER FOR MOTOR VEHICLE WITH MECHANICAL STATIC CONVERTER

FIELD OF THE INVENTION

The invention concerns a multiphase rotary electrical machine which can be associated with an engine such as the internal combustion engine, also referred to as the thermal engine, of a motor vehicle and is able to be used on the one hand as an electrical generator when it is driven by the engine and on the other hand as an electric motor for starting the engine with which it is associated, the machine comprising a shaft carrying a rotor with magnetic poles surrounded by a multiphase stator constituting an armature and provided with windings defining the phases of the machine, a diode bridge for rectifying the current generated by the stator windings when the machine is functioning in generator mode and a device for supplying electric current to the stator windings when the machine is functioning in motor mode.

STATE OF THE ART

Such a machine, of the reversible type, normally referred to as an "alternator/starter", is for example described in the document EP-A-0260176. In this known machine, the device for supplying current to the stator windings in electric motor operating mode comprises essentially electronic switching means comprising static switches such as transistors or thyristors connected in parallel to the diodes of the bridge rectifier and controlled from an electronic assembly with which there are associated sensors for the angular position of the rotor for supplying to the assembly information on the angular positions of the rotor, the sensors being able to consist of Hall effect sensors or optoelectronic sensors.

In certain embodiments the diodes of the bridge rectifier are integrated in the static switches and transistors of the MOS type are used for this purpose. In all cases an inverter is formed. For more information reference can also be made to the document FR-A-2 745 445.

This known reversible electrical machine has the drawback that the current supply device which has just been described uses a large number of specific components and is therefore relatively expensive.

OBJECT OF THE INVENTION

The aim of the present invention is to propose a reversible rotary electrical machine of the type defined above which mitigates this drawback.

To achieve this aim, the device supplying current to the stator windings is produced in the form of a mechanical inverter able to be coupled to the aforementioned shaft of the machine and connected to the stator windings.

BRIEF DESCRIPTION OF THE DRAWINGS

The invention will be better understood and other aims, characteristics, details and advantages thereof will emerge more clearly from the following explanatory description made with reference to the accompanying schematic drawings given solely by way of example, illustrating an embodiment of the invention and in which:

FIG. 1 is a simplified schematic view of a reversible rotary electrical machine constituting an alternator/starter according to the invention;

FIG. 2 is a view in section of the line II—II in FIG. 1, the brushes having been omitted;

DESCRIPTION OF EMBODIMENTS OF THE INVENTION

Figure 3:
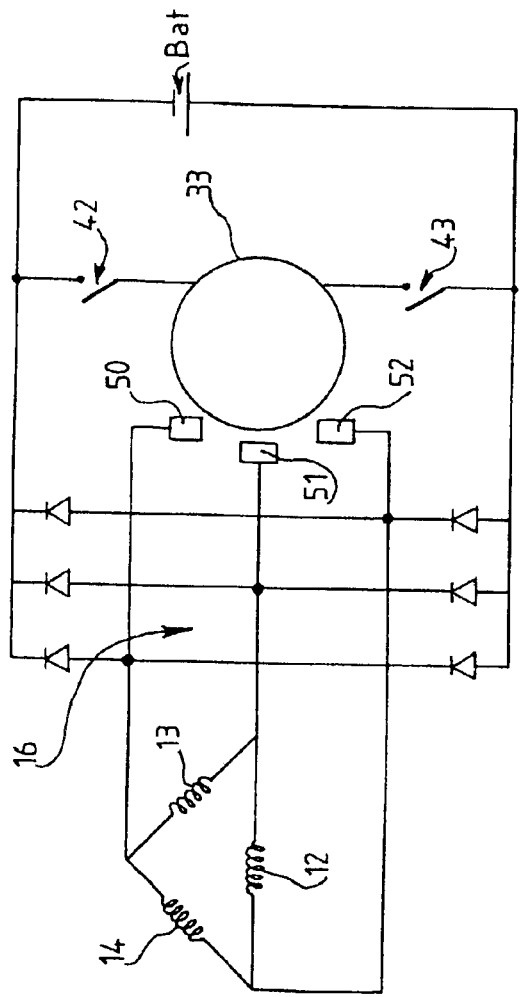
FIG. 3 is a view in the direction of the arrow III in FIG. 1.

As can be seen in FIG. 1, a reversible rotary electrical machine according to the invention, that is to say one constituting an alternator/starter, comprises essentially a conventional alternator 1, a device for supplying current to the stator windings of the alternator when the machine is to function in electric motor and which is able to be coupled to the shaft of the alternator 1, as well as a device 3 for coupling the supply device 2 to the alternator 1.

The alternator 1, which can be a three-phase alternator with internal ventilation and a conventional structure for a motor vehicle comprises essentially, in a manner known per se, a shaft 5 carrying a rotor 6 with claws belonging to pole wheels with plates, between which there is mounted an excitation winding, not visible, the ends of which are connected, in a well-known manner, by wire connections to collecting tracks 8, 9 in the form of rings carried by the rear end of the shaft 5. The rotor is surrounded by a wound stator 11 provided here with three windings for defining three phases. The three windings are indicated at 12 to 14 in the electrical diagram in FIG. 4.

The stator constitutes an armature and comprises a stator body in the form of a packet of metal sheets grooved for the mounting of the stator coil passing through the body and extending on each side thereof in order to form networks called leading-out wires. The coil comprises windings 12 to 14. With this stator there is associated, in a manner known per se, a diode bridge for rectifying the alternating current generated by the alternator when it is functioning as an electrical generator. This rectifier bridge is not shown in FIG. 1 but is indicated at 16 on the electrical diagram in FIG. 4. The shaft 5 of the alternator carries, at its end opposite to the one provided with the collecting tracks 8 and 9, a pulley 18 around which a transmission belt, not shown, passes for rotationally driving the shaft 5 during functioning in generator mode or for transmitting the rotation movement for starting for example an internal combustion engine of a motor vehicle.

FIG. 1 also shows at 20 and 21 the roller bearings by means of which the shaft 5 is supported in the front bearing 23 and the rear bearing 24 supporting the stator. The bearings 23, 24 are perforated for circulation of air.

FIG. 1 then indicates at 25 the brush holder associated with the tracks 8, 9 and the conventional alternator regulator. The references 19 and 22 designate front and rear fans carried by the rotor in order to cool the electrical machine.

It is not necessary to describe in any further detail the structure of the alternator 1 which, as indicated above, is conventional firstly, and secondly because the details of its standard structure do not participate in the invention.

For the record it will be stated that, when the excitation winding of the rotor is supplied, it is formed at the level of the claws from pairs of magnetic poles.

On the other hand one particularity of the alternator 1, added to its standard structure, lies in the fact that the shaft 5 is extended at the rear on the side of the collecting tracks 8 and 9 and that this extension, designated by the reference 26, forms a fluted end comprising as many flutes 27 as there are pairs of alternator poles.

According to one essential characteristic of the invention, the device 2 supplying current through the windings 12, 13, 14 of the stator 11 of the alternator 1 is formed by a mechanical switch or inverter. The windings 12, 13, 14 of the stator phases have outputs which are for example connected in a delta and are connected to the bridge rectifier.

This switch has three parts, namely two smooth rings 30, 31 and a bar commutator 33. The rings and the commutator are carried by a rotary body 34 whose shaft is indicated at 35. The body 34 is rotationally fixed to the shaft 35. The latter is supported by bearings such as the bearing 37. The rings 30, 31 and the commutator 33 are axially juxtaposed on the body 34 at the periphery thereof. The commutator is situated between the rings.

The rings 30, 31 are each connected via a brush 39, 40 and by means of a contact 42, 43 of a power contactor 44 to the positive and negative terminals of a battery Bat. The ring 30 is thus called the positive ring and the ring 31 the negative ring.

The bar commutator 33 carries on its peripheral surface, successively in the peripheral direction, a neutral bar 46, a positive bar 47, a neutral bar 46, a negative bar 48, a neutral bar 46, a positive bar 47 and so on, as shown in FIG. 2.

The number of each type of bar is equal to the number of pairs of poles on the alternator 1. The positive bars 47 are electrically connected to the positive ring 30, the negative bars 48 to the negative ring 31.

With the commutator 33 there are associated three brushes 50, 51, 52 which are disposed around the commutator in rubbing contact with the bars. The brushes are separated from each other by an electrical angle of 120°. The brushes 50, 51, 52 are connected respectively to the windings 12, 13 and 14 of the stator of the alternator 1, for example as depicted in FIG. 1. Thus each winding terminal receives, during the rotation of the rotary body 34, successively the positive, neutral, negative, neutral, positive potentials and so on.

Consequently the assembly which has just been described functions as a mechanical inverter.

FIG. 3 illustrates yet another advantageous possibility of a fine adjustment of the angular position of the brushes 51 with respect to the relative differences in positioning of the stator and rotor. This adjustment is advantageously made by relative rotation within the limit of oblong-shaped slots 76 in the peripheral direction of a brush support, not shown specifically in FIG. 1, with respect to the casing part of the inverter, which is indicated at 78 in FIG. 1.

It will be understood that the reversible machine according to the invention can function in electric motor mode, that is to say as a starter for an internal combustion engine, or as an auxiliary motor for driving for example the compressor of an air conditioning installation, when the device 2 supplying the phase windings of the stator of the alternator 1, formed by the inverter, is coupled to the alternator.

For this purpose the front end 54 of the shaft 35 of the inverter 2 is axially fluted. The number of axial flutes 56 is equal to the number of flutes 27 on the end 26 of the alternator rotor shaft, that is to say to the number of pairs of poles thereon. The fluted end 54 of the inverter is situated axially facing the fluted end 26.

An internally fluted coupling sleeve 58 is disposed so as to slide freely on this fluted end 54. This sleeve can be moved axially by the coupling device 3 between a position in which it is withdrawn on the fluted end 54 as depicted in FIG. 1 and a position of coupling the inverter to the alternator in which the sleeve is simultaneously engaged on the fluted end 26 of the end 56.

The coupling device 3 comprises essentially a fork 60 mounted so as to pivot at 62, one end 64 of which is articulated on the periphery of the sleeve 58 whilst its other end 66, which is angled, is articulated on a moving core 68 of a solenoid coil 70.

Figure 4:
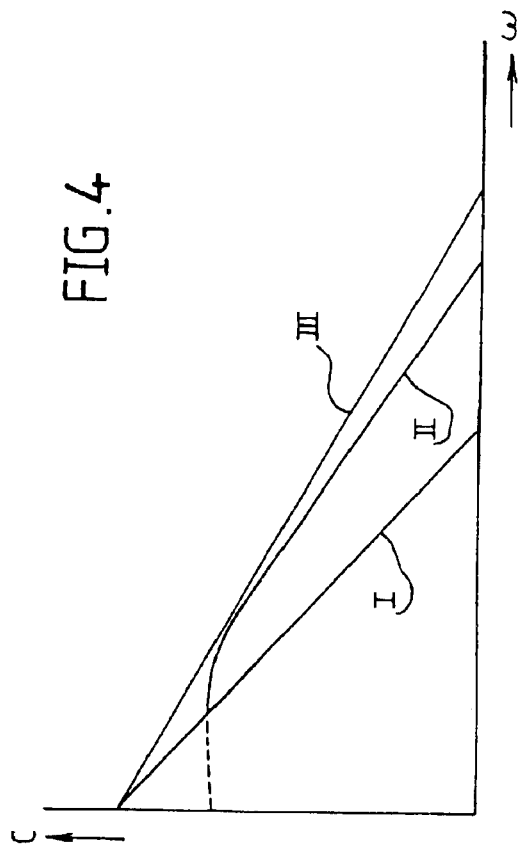
FIG. 4 shows the electrical diagram of the reversible multiphase rotary electrical machine according to FIG. 1.

The core is provided with a rod 72 for opening and closing the contacts 42, 43 of the power contactor 44 depicted in FIG. 4.

When the coil 70 is excited, the core 68 moves via the sleeve 58 and the fluted ends 26, 54 counter to a return spring 74. The movement results in the movement of the sleeve 58 into its position of coupling the inverter 2 to the alternator 1 and the closure of the contacts 42, 43.

Concerning the functioning of the reversible rotary electrical machine according to the invention, when it is to function in alternator mode it is driven, via its pulley 18 and a transmission device comprising at least one belt, by the thermal engine of the motor vehicle with which it is associated and the inverter is disengaged. The sleeve 58 occupies the position depicted in FIG. 1.

When it is wished to start the thermal engine the machine is converted into a starter by supplying the coil 70 of the power contactor. The excitation of the coil causes the movement of the core 68 which, on the other hand, causes the coupling of the inverter 2 to the alternator 1 via the sleeve 58 and the fluted ends 26, 54 and the closure of the contacts 42 and 43. Following this closure of the contacts and the connection thus established between the poles of the battery Bat and the rings 30, 31 of the inverter, a current can flow through the bars of the commutator 33 and the brushes 50, 51, 52 into the windings of the stator of the alternator 1, producing a torque C enabling the thermal engine to be started.

When starting is over, the current is cut off in the coil 70, which enables the spring 74 to push the fork 60 again, which then returns the sleeve to its position of initial disengagement of the inverter 2. The machine then functions in alternator mode.

During the starting phases the invention advantageously re-uses the rotor overexcitation as described in the patent EP0260176.

Figure 5:
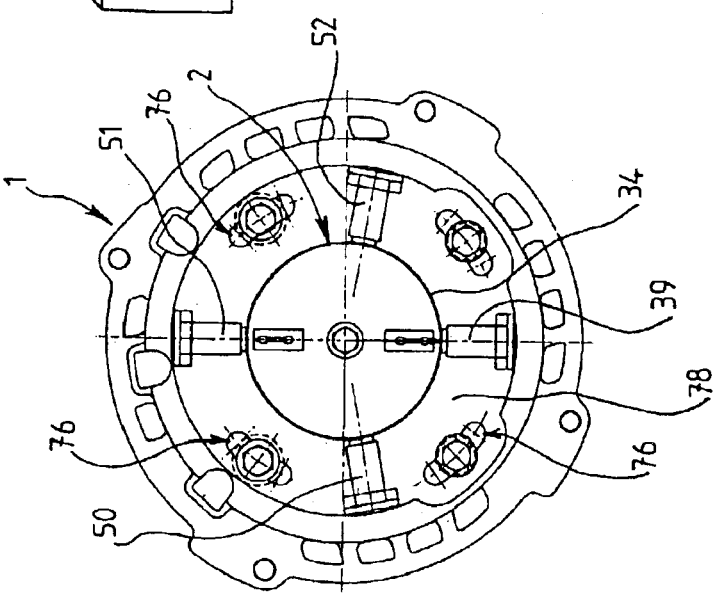
FIG. 5 illustrates, in the form of characteristic curves, the torque C according to the speed of rotation Ω of the machine according to the invention, functioning as a motor.

In the embodiment of the invention which has just been described and is depicted in the figure, the flutes 27 on the rotor of the machine are straight and extend axially. It should be noted that the choice of the number of flutes on the rotor and on the inverter equal to the number of pairs of poles ensures the correct positioning of the inverter with respect to the alternator and thus the appropriate supply of the windings 12, 13, 14 of the alternator stator. According to a variant of the invention, the flutes 27 carried by the rotor shaft 26 could be helical. In this case, the power contactor 44 comprises a second coil (not shown). This is supplied as soon as a certain speed of rotation is obtained. This allows a different fixing by translation in the helical part which rotationally offsets the mechanical inverter 2 and optimises the torque curve C according to the speed of rotation in a continuously variable or stepping manner, as can be seen in FIG. 5.

This figure shows at I the curve obtained with a straight flute without the use of a second coil. The curve II illustrates the torque C according to the speed of rotation with use of the second coil in two-state mode and the curve III the torque obtained with the use of the second coil of the fork movement control.

Naturally the alternator can have more than three phases and be for example of the type described in the document FR-2 819 117; the windings being of the needle type.

It will be appreciated that use is made of the components of an alternator which is mass produced, and therefore economical, and whose shaft is extended to the rear according to one characteristic of the invention.

The mechanical inverter is mounted outside the machine and is coupled to the extension of the shaft so that there is no need to profoundly modify the design of a conventional alternator. It is possible to use an alternator already having a shaft extended towards the rear for driving a vacuum pump.

What is claimed is:

1. Multiphase rotary electrical machine which can be associated with an internal combustion engine and is able to be used on the one hand as an electrical generator when it is driven by the internal combustion engine and on the other hand as an electric motor for starting the engine with which it is associated, the machine comprising a shaft carrying a rotor with magnetic poles surrounded by a multiphase stator constituting an armature and provided with windings defining the phases of the machine, a diode bridge for rectifying the current generated by the stator windings when the machine is functioning in generator mode and a device for supplying electric current to the stator windings when the machine is functioning in motor mode, wherein the shaft of the machine comprises an extension, and wherein the device (3) for supplying current to the stator windings is mounted outside that machine and comprises a mechanical inverter (2) able to be coupled to the extension of the shaft of the machine and connected to the windings (12–14) of the stator,and further comprising an alternator (1) with a conventional structure, coupled to the mechanical inverter (2) through the shaft of the rotor (5) when the machine is functioning in motor mode.

2. Machine according to claim 1, characterised in that the inverter (2) is produced in the form of a rotary body (34) carrying a bar commutator (33) comprising on its peripheral surface a succession of positive (47), negative (48) and neutral (46) bars, a neutral bar always being interposed between a positive bar and a negative bar, and brushes (50, 51, 52) for applying the electrical potential of the bars (46, 47, 48) to the windings (12, 13, 14) of the alternator (7).

3. Machine according to claim 2, characterised in that the rotary body (34) carries a positive ring (30) and a negative ring (31) both able to be connected to the respectively positive and negative terminals of an electrical energy source such as the battery (Bat) of a motor vehicle, and in that the positive (47) and negative (48) bars are electrically connected to the positive (30) and negative (31) rings.

4. The machine according to claim 3, wherein the machine further comprises a device (3) for coupling the inverter (2) to the alternator by means is of a piece (58) for coupling one end (54) of the shaft (35) of the rotary inverter body (34) to a shaft end of the rotor (26) of the alternator (1).

5. Machine according to claim 3, characterised in that the positive rings (30) and the negative rings (31) are connected to the aforementioned source (Bat) by brushes (39, 40) via contacts (42, 43) of a power contactor (44).

6. The machine according to claim 5, wherein the machine further comprises a device (3) for coupling the inverter (2) to the alternator by means of a piece (58) for coupling one end (54) of the shaft (35) of the rotary inverter body (34) to a shaft end of the rotor (26) of the alternator (1).

7. Machine according to claim 2, wherein the machine further comprises a device (3) for coupling the inverter (2) to the alternator by means of a piece (58) for coupling one end (54) of the shaft (35) of the rotary inverter body (34) to a shaft end of the rotor (26) of the alternator (1).

8. Machine according to claim 7, characterised in that the shaft end (26) and the end (54) are fluted and the coupling piece (58) is formed by an internally fluted sleeve which is able to slide axially between a disengaged position on the said end (26) or the said end (54) and a coupling position in which it is engaged simultaneously on each of the said ends and in that the number of flutes on the shaft end (26) and the end (54) is equal to the number of pairs of poles of the alternator (1).

9. Machine according to claim 8, characterised in that the coupling device comprises a fork (60) for moving the sleeve (58) which is mounted so as to pivot (at 62) and articulated at one end of the sleeve at the other end, a movable core (68) of a coil (70) of a power contactor (44) to be excited when the machine is to function as a motor.

10. Machine according to claim 9, characterised in that the movable core (68) constitutes the device for closing contacts (42, 43) for electrical connection of the rings (30, 31) of the inverter (2) to the terminals of the battery (Bat) when the coil (70) is excited.

11. Machine according to claim 8, characterised in that the flutes (27) on the end of the shaft (26) of the alternator and the flutes (56) on the shaft end (54) of the rotary body (34) of the inverter are straight flutes.

12. Machine according to claim 8, characterised in that the flutes (27) on the shaft end (26) of the alternator are helical and the power contactor (44) comprises a second coil for optimizing the torque (C) produced in motor mode, according to the speed of rotation of the machine.

* * * * *